(No Model.)
W. J. KAYSER.
COMBINED FUNNEL AND STRAINER.
No. 495,635. Patented Apr. 18, 1893.
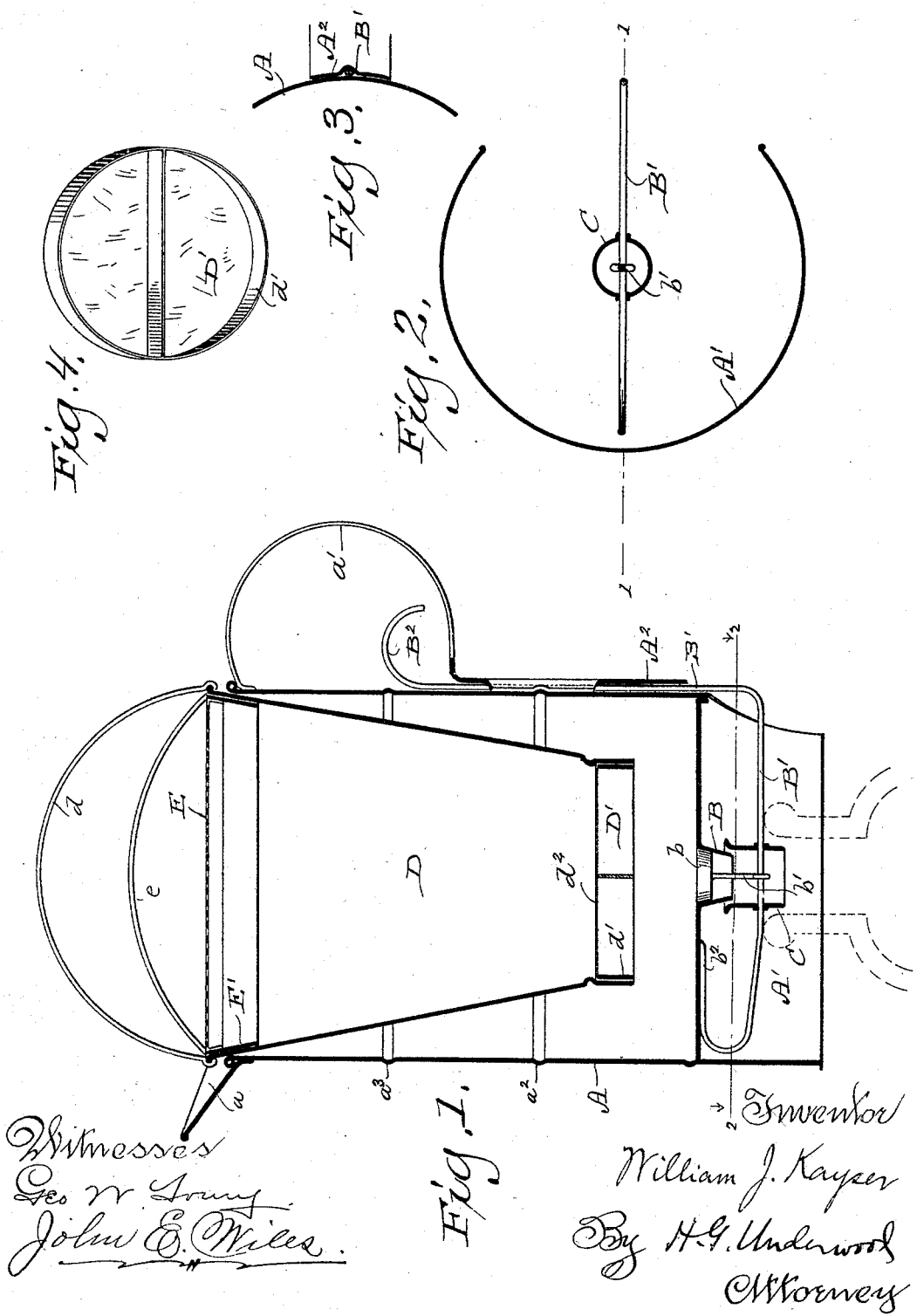
Witnesses
Geo. W. Young
John E. Miles.
Inventor
William J. Kayser
By H. G. Underwood
Attorney
THE NORRIS PETERS CO., PHOTO-LITHO., WASHINGTON, D. C.

UNITED STATES PATENT OFFICE.

WILLIAM J. KAYSER, OF MILWAUKEE, WISCONSIN, ASSIGNOR OF ONE-THIRD TO ISIDOR LEISER, OF SAME PLACE.

COMBINED FUNNEL AND STRAINER.

SPECIFICATION forming part of Letters Patent No. 495,635, dated April 18, 1893.

Application filed February 23, 1892. Serial No. 422,522. (No model.)

*To all whom it may concern:*

Be it known that I, WILLIAM J. KAYSER, a citizen of the United States, and a resident of Milwaukee, in the county of Milwaukee, and in the State of Wisconsin, have invented certain new and useful Improvements in a Combined Funnel and Strainer; and I do hereby declare that the following is a full, clear, and exact description thereof.

My invention relates to combined funnels and strainers, and consists in the matters hereinafter described and pointed out in the appended claims.

In the accompanying drawings illustrating my invention, Figure 1. is a central vertical section of a utensil constructed in accordance with my invention. Fig. 2. is a horizontal sectional view of the same taken on line 2—2, of Fig. 1. Fig. 3. is a detail sectional view illustrating the construction of one of the parts. Fig. 4. is a perspective view of one of the parts detached.

In said drawings:—A represents a vessel, preferably of substantially cylindrical form, divided into standard measurements as shown at $a^2$ $a^3$ and conveniently provided with a spout $a$ and a handle $a'$. In the bottom of the vessel A is provided a short, downwardly extending tubular projection B, through which liquids from the interior of the vessel A may pass, and a downwardly closing valve $b$ is fitted within said tubular outlet, the stem $b'$ of said valve being extended to the outside of said tube and engaged with a transversely arranged spring rod B' which is secured at one end to the bottom of the vessel, as at $b^2$ and which serves to normally hold the valve $b$ closed. A short tube C is engaged with the spring rod B' in such a position as to surround the lower end of the tube B, as illustrated in Fig. 1. The free end of the spring rod B' is bent upwardly outside of the vessel A and terminates in a hook $B^2$ by means of which the said rod may be raised so as to open the valve $b$, this upwardly bent portion of said rod being arranged to move vertically within a channel formed between the outer surface of the body of the vessel, and a downwardly extending strip $A^2$ which is preferably a continuation of the strip of metal which forms the handle $a'$. By this arrangement, the hooked end of the rod B' is brought into convenient position to enable the user to grasp it with one finger while he holds the vessel by the handle $a'$.

The bottom of the vessel A is conveniently provided with a downwardly extending flange A' which projects below the spring rod B' and the tube C, and affords a support for the vessel when resting upon a flat surface, without permitting the said parts to come into contact with said surface.

D represents a preferably frustum shaped tubular part, larger at its upper end, where it is conveniently fitted within the upper end of the vessel A, as shown, said part D being made removable and provided with a bail or handle $d$. A strainer D' is located in the lower end of the said part which comprises a ring $d'$ removably fitted to the lower end of the frustum shaped part D, and a layer of cloth or other straining material $d^2$ stretched over said ring.

A second strainer E, preferably of coarser mesh than the strainer D', is removably fitted within the larger end of the part D, said latter strainer being provided with a supporting ring E', to which is secured a bail or handle $e$, as shown.

The operation of my improved device is as follows:—When it is desired to use the utensil to strain liquids, both of the strainers may be used if desired, or if preferred, the strainer E, may be removed and only the fine meshed strainer D' used. The liquids are poured into the frustum shaped part D and pass through the strainer or strainers, into the outer vessel A, from which they may be permitted to escape through the tubular outlet B, by opening the valve $b$ in the manner before described, or, if desired, the part D with the strainers may be lifted out, and said liquids poured from the spout $a$. When only the coarser meshed strainer is needed, the part D may be removed and the strainer E placed in the bottom of the vessel A in an obvious manner, and the liquid to be strained, poured into said vessel, the valve $b$ being opened, and said liquid permitted to escape through the tubular outlet B.

In practice, I find that the utensil is especially well adapted for use in filling bottles and for similar purposes, and in using the device for such purposes, the lower end of the tubular portion C, is inserted in the neck of the bottle or other vessel to be filled, the handle B² being raised so as to open the valve, and the liquid then permitted to escape through the outlet B and through the tube C into the bottle.

As illustrated in Figs. 1 and 2 of the drawings, one side of the supporting flange A' is preferably cut away so as to permit the device to be placed over the mouth of a jug or other article having a handle, without interfering with said handle.

Having thus described my invention, what I claim as new, and desire to secure by Letters Patent of the United States, is—

1. A combination utensil, comprising a vessel having a valve controlled outlet in its bottom, and a tubular part removably engaged with the interior of said vessel and provided with one or more removable strainers, substantially as described.

2. A combination utensil, comprising an outer vessel having a valve controlled outlet in its bottom, and a tapered or frustum shaped part adapted for removable engagement with the inside of said vessel and provided at its upper and lower ends with independently removable strainers, substantially as described.

In testimony that I claim the foregoing I have hereunto set my hand, at Milwaukee, in the county of Milwaukee and State of Wisconsin, in the presence of two witnesses.

WILLIAM J. KAYSER.

Witnesses:
H. G. UNDERWOOD,
JOHN E. WILES.